United States Patent
Choi et al.

(10) Patent No.: US 12,055,491 B2
(45) Date of Patent: Aug. 6, 2024

(54) FOCUS SCAN TYPE IMAGING DEVICE FOR IMAGING TARGET OBJECT IN SAMPLE THAT INDUCES ABERRATION

(71) Applicants: Korea University Research and Business Foundation, Seoul (KR); INSTITUTE FOR BASIC SCIENCE, Daejeon (KR)

(72) Inventors: Won-Shik Choi, Seoul (KR); Seok-Chan Yoon, Seoul (KR); Ho-Jun Lee, Seoul (KR)

(73) Assignees: Korea University Research and Business Foundation, Seoul (KR); INSTITUTE FOR BASIC SCIENCE, Daejeon (KR)

( * ) Notice: Subject to any disclaimer, the term of this patent is extended or adjusted under 35 U.S.C. 154(b) by 281 days.

(21) Appl. No.: 17/772,305

(22) PCT Filed: Oct. 12, 2020

(86) PCT No.: PCT/KR2020/013840
§ 371 (c)(1),
(2) Date: Apr. 27, 2022

(87) PCT Pub. No.: WO2021/085889
PCT Pub. Date: May 6, 2021

(65) Prior Publication Data
US 2022/0381695 A1    Dec. 1, 2022

(30) Foreign Application Priority Data
Oct. 31, 2019 (KR) ........................ 10-2019-0137258

(51) Int. Cl.
*G01N 21/64*      (2006.01)
*G01B 9/02*      (2022.01)
(Continued)

(52) U.S. Cl.
CPC ..... *G01N 21/6456* (2013.01); *G01B 9/02041* (2013.01); *H04N 3/08* (2013.01);
(Continued)

(58) Field of Classification Search
CPC ............ G01N 21/6456; G01B 9/02041; G01B 9/02038; G01B 9/02083; G01B 2290/65;
(Continued)

(56) References Cited

U.S. PATENT DOCUMENTS

| | | | | |
|---|---|---|---|---|
| 2006/0058682 | A1* | 3/2006 | Miller | ............... G01B 9/02007 600/476 |
| 2007/0195329 | A1 | 8/2007 | Guthals et al. | |

FOREIGN PATENT DOCUMENTS

| | | |
|---|---|---|
| JP | 2015-219502 A | 12/2015 |
| KR | 10-1891036 B1 | 8/2018 |
| WO | WO 2014/152739 A2 | 9/2014 |

OTHER PUBLICATIONS

Kang, Sungsam, et al. "High-resolution adaptive optical imaging within thick scattering media using closed-loop accumulation of single scattering." *Nature communications* vol. 8.1 (Dec. 18, 2017): pp. 1-10.

\* cited by examiner

*Primary Examiner* — David P Porta
*Assistant Examiner* — Mamadou Faye
(74) *Attorney, Agent, or Firm* — NSIP Law

(57) ABSTRACT

A focus scan type imaging device for imaging a target object in a sample that induces aberration proposed. The device includes: a light source unit for emitting a beam; an optical interferometer for splitting the beam emitted from the light source into a sample wave and a reference wave, and providing an interference wave formed by interference between a reflection wave that is the sample wave reflected from the sample and the reference wave; a camera module (Continued)

for imaging the interference wave; a scanning mirror disposed on an optical path of the sample wave of the optical interferometer and configured to reflect the sample wave to cause the sample wave to scan the sample; a wavefront shaping modulator disposed on the optical path of the sample wave of the optical interferometer; and an imaging controller configured to operate in a phase map calculation mode and in an imaging mode.

6 Claims, 10 Drawing Sheets

(51) Int. Cl.
  *H04N 3/08* (2006.01)
  *H04N 23/55* (2023.01)
  *H04N 23/56* (2023.01)
  *H04N 23/667* (2023.01)
(52) U.S. Cl.
  CPC ............. *H04N 23/55* (2023.01); *H04N 23/56* (2023.01); *H04N 23/667* (2023.01)
(58) Field of Classification Search
  CPC .. G01B 9/02091; G01B 9/02032; H04N 3/08; H04N 23/55; H04N 23/56; H04N 23/667; H04N 23/67; G02B 21/00; G02B 21/36; G02B 21/0024; G02B 21/361; G02B 21/365
  See application file for complete search history.

FOCUS SCAN TYPE IMAGING DEVICE FOR IMAGING TARGET OBJECT IN SAMPLE THAT INDUCES ABERRATION

CROSS REFERENCE TO RELATED APPLICATIONS

This application is a U.S. National Stage Application of International Application No. PCT/KR2020/013840, filed on Oct. 12, 2020, which claims the benefit under 35 USC 119(a) and 365(b) of Korean Patent Application No. 10-2019-0137258, filed on Oct. 31, 2019 in the Korean Intellectual Property Office, the entire disclosure of which is incorporated herein by reference for all purposes.

TECHNICAL FIELD

The present disclosure relates to a focus scan type imaging device for imaging a target object in a sample that induces aberration and, more particularly, to a focus scan type imaging device for imaging a target object in a sample that induces aberration, wherein real-time imaging at higher speeds is possible when imaging the target object in a medium that induces the aberration, especially, scattering and the aberration at the same time.

BACKGROUND ART

Confocal imaging has a structure that is most widely used in an optical microscopy to inspect deep tissue. The reason is because the confocal imaging may remove signals generated from an out-of-focus plane, and may also remove unwanted noise caused by multiple scatterings.

However, when sample-induced aberrations exist, signals including target object information spread away from a confocal pinhole due to blur of a point spread function. The aberrations reduce the contrast of an image, causing a decrease in resolving power as the depth of the image increases.

A key point to addressing the sample-induced aberrations and achieving ideal diffraction-limited imaging deep within a scattering medium is to coherently refocus non-confocal signals, i.e., signals arriving at a position other than a confocal pinhole, to a confocal detection position. It is very important to selectively refocus on blurred signals rather than multiple scattering noises, because the multiple scattering noises as well as the blurred signals arrive at a non-confocal position.

The simplest way to focus and transmit the non-confocal signals to the confocal position is to place a wavefront shaping modulator such as a deformable mirror or a liquid-crystal spatial light modulator in an illumination light path and/or a detection light path. In order to selectively focus the blurred signals, a wavefront of the spatial light modulator is iteratively adjusted in such a way as to maximally increase the intensity or sharpness of a confocal image.

Although such a sensorless adoptive optics method may detect high-order aberrations mainly in fluorescence imaging, the time spent in a feedback process tends to take as long as that required to obtain an image for each iteration step. A model-based modal aberration correction approach may reduce the time required for optimization, but this approach only works for some of the lowest modes of Zernike polynomials.

In order to correct the sample-induced aberrations by minimizing the number of image acquisitions, several approaches based on measuring the wavefronts of backscattered signals have been proposed. In order to record wavefronts, a Shark-Hartmann wavefront sensor and interference microscopy have been widely used. In this so-called wavefront sensing, finding of aberrations from the measured wavefronts is a very important step. Usually, sample-induced aberrations to the illumination light path and detection light path affect the measured wavefronts. Mathematically, convolution of a point spread function occurs, which is detected by multiplication of an illumination point spread function and a target object, and accordingly, it becomes difficult to extract each of illumination point spread functions containing sample-induced aberrations.

In conventional study results, such a double-pass problem is solved only in limited cases. Similar to a guide star in astronomy, in the simplest case where a source such as a point in a sample exists, the multiplication of the illumination point spread function and a target object is simply a point source. Accordingly, the measured wavefronts at a pupil plane becomes equal to the sample-induced aberrations in the detection light path. The guide star is not always available, but a photoreceptor cell in non-linear excitation and retinal imaging may play a role close to that of an intrinsic guide star.

A method that may be expected as another strategy is to emit plane waves, whereby aberrations in an illumination light path may be maximally reduced. In addition, by optimizing an image measurement standard such as image sharpness through calculation, the aberrations may be identified in the detected wavefronts. As a trade-off with planar illumination, such an approach is susceptible to multiple scattering noises due to loss of confocal gating.

In this regard, an algorithm expressed as closed-loop accumulation of single scattering (CLASS) that may simultaneously correct scatterings and aberrations is proposed in a thesis "HIGH-RESOLUTION ADAPTIVE OPTICAL IMAGING WITHIN THICK SCATTERING MEDIA USING CLOSED-LOOP ACCUMULATION OF SINGLE SCATTERING (Nature Communications volume 8, Article number: 2157, 2017)" of the inventor of the present application.

In the CLASS algorithm, a time-gated reflection matrix is converted into a spectrum for each angle, and then a phase change of a light wavefront for each angle is numerically searched and compensated, so that single scattering cumulative light signals required for imaging a target object are maximally increased, thereby optimizing an image.

In a time-gated hologram imaging method similar to the CLASS method proposed by the inventor, an image of interference between a sample light and a reference light is obtained by using an interferometric method using plane waves. In this case, a difference between the temporal wavefronts of the sample light and the reference light is limited within a coherence distance of a light source. Accordingly, when the light source having a short coherence distance is used to obtain detailed time-gated information, a temporal wavefront error on a micro-scale is allowed.

In order to match the temporal wavefronts of the sample light to the temporal wavefronts of the reference light on the micro-scale, in the conventional time-gated holographic imaging method, as shown in FIG. 1, a spatial light modulator provided with a liquid crystal composed as a fundamental medium is used to modulate an angle of each incident wave illuminating a sample. Then, only the spatial wavefronts are able to be changed, while maintaining the temporal wavefronts of the sample light.

Meanwhile, since the spatial light modulator using such a liquid crystal has a quality level where a conversion rate is fundamentally around 10 Hz, there is a disadvantage in that a speed of measuring a time-gated reflection matrix is very slow. Therefore, in the conventional time-gated holographic imaging method, the time to measure the time-gated reflection matrix takes more than ten minutes, thereby being considered that observing a living body in real time is practically difficult.

DISCLOSURE

Technical Problem

Accordingly, the present disclosure has been devised to solve the above problems, and an objective of the present disclosure is to provide a focus scan type imaging device for imaging a target object in a sample that induces aberration, wherein real-time imaging at higher speeds is possible when imaging the target object in a medium that induces the aberration, especially, scattering and the aberration at the same time.

Technical Solution

According to the present disclosure, the above objective is achieved by a focus scan type imaging device for imaging a target object in a sample that induces aberration, the device including: a light source unit configured to emit a beam; an optical interferometer configured to split the beam emitted from the light source into a sample wave and a reference wave, and provide an interference wave formed by interference between a reflection wave that is the sample wave reflected from the sample and the reference wave; a camera module configured to image the interference wave; a scanning mirror disposed on an optical path of the sample wave of the optical interferometer and configured to reflect the sample wave so as to cause the sample wave to scan the sample; a wavefront shaping modulator disposed on the optical path of the sample wave of the optical interferometer; and an imaging controller configured to operate in a phase map calculation mode in which an aberration-corrected phase map for correction of sample-induced aberrations is calculated, and in an imaging mode in which the aberration-corrected phase map is displayed on the wavefront shaping modulator to image the target object in a state where the sample-induced aberrations are corrected, wherein the imaging controller controls the wavefront shaping modulator to operate as a mirror in the phase map calculation mode, and calculates the aberration-corrected phase map on the basis of a CLASS algorithm.

Here, the imaging controller may be configured to perform, in the phase map calculation mode, steps including: controlling the scanning mirror so as to cause the sample to be focus-scanned with the sample wave; obtaining a plurality of time-gated complex field images on the basis of the respective interference wave imaged for each point of the sample by the camera module through focus scanning; generating a position basis time-gated reflection matrix by using the plurality of time-gated complex field images; transforming the position basis time-gated reflection matrix into a spatial frequency basis time-gated reflection matrix; and extracting an aberration phase map of the sample-induced aberrations by applying the spatial frequency basis time-gated reflection matrix to the CLASS algorithm, and is configured to generate the aberration-corrected phase map through phase conjugation of the aberration phase map.

In addition, in the generating of the position basis time-gated reflection matrix, each time-gated complex field image may be generated by being assigned to a respective column of the position basis time-gated reflection matrix as a vector.

In addition, in the transforming of the position basis time-gated reflection matrix into the spatial frequency basis time-gated reflection matrix, the spatial frequency basis time-gated reflection matrix may be transformed by applying a Fourier transform to each of row vectors and column vectors, constituting the position basis time-gated reflection matrix.

In addition, in the extracting of the aberration phase map, any one of a complex pupil function of the sample wave and a complex pupil function of the reflection wave, which are obtained for aberration correction in the CLASS algorithm, may be extracted as the aberration phase map.

In addition, the focus scan type imaging device for imaging the target object in the sample that induces the aberration may further include: a wavelength splitter configured to pass fluorescence waves among the reflection waves reflected from the sample and reflect remaining waves of the reflection waves toward the optical interferometer; and a photomultiplier tube into which the fluorescence waves passing through the wavelength splitter are incident, wherein the imaging controller may generate a fluorescence image on the basis of the fluorescence waves detected by the photomultiplier tube in the imaging mode.

Advantageous Effects

According to the present disclosure in accordance with the above configuration, in the conventional CLASS algorithm, an image is obtained by changing the wavefronts of a wavefront shaping modulator such as a spatial light modulator a plurality of times in a state of emitting plane waves, and then the image is calculated numerically, whereby an imaging time according to the wavefront changes of the wavefront shaping modulator increases. Whereas, in the focus scan type imaging device according to the present disclosure, an aberration-corrected phase map is calculated in the focus scan type through adjusting the angles of scanning mirrors, whereby the imaging time may be reduced.

In addition, in a state where the aberration-corrected phase map is calculated and then displayed on the wavefront shaping modulator, the sample-induced aberrations are physically corrected, whereby imaging of the target object may be conducted in real time without a separate image processing process for aberration correction.

BEST MODE

The present disclosure relates to a focus scan type imaging device for imaging a target object in a sample that induces aberration, and includes: a light source unit configured to emit a beam; an optical interferometer configured to split the beam emitted from the light source into a sample wave and a reference wave, and provide an interference wave formed by interference between a reflection wave that is the sample wave reflected from the sample and the reference wave; a camera module configured to image the interference wave; a scanning mirror disposed on an optical path of the sample wave of the optical interferometer and configured to reflect the sample wave so as to cause the sample wave to scan the sample; a wavefront shaping modulator disposed on the optical path of the sample wave of the optical interferometer; and an imaging controller configured to operate in a phase map calculation mode in which an aberration-corrected phase map for correction of sample-induced aberrations is calculated, and in an imaging mode in which the aberration-corrected phase map is displayed on the wavefront shaping modulator to image the target object in a state where the sample-induced aberrations are corrected, wherein the imaging controller controls the wavefront shaping modulator to operate as a mirror in the phase map calculation mode, and calculates the aberration-corrected phase map on the basis of a CLASS algorithm.

Mode for Invention

Hereinafter, exemplary embodiments according to the present disclosure will be described in detail with reference to the accompanying drawings.

Figure 1:
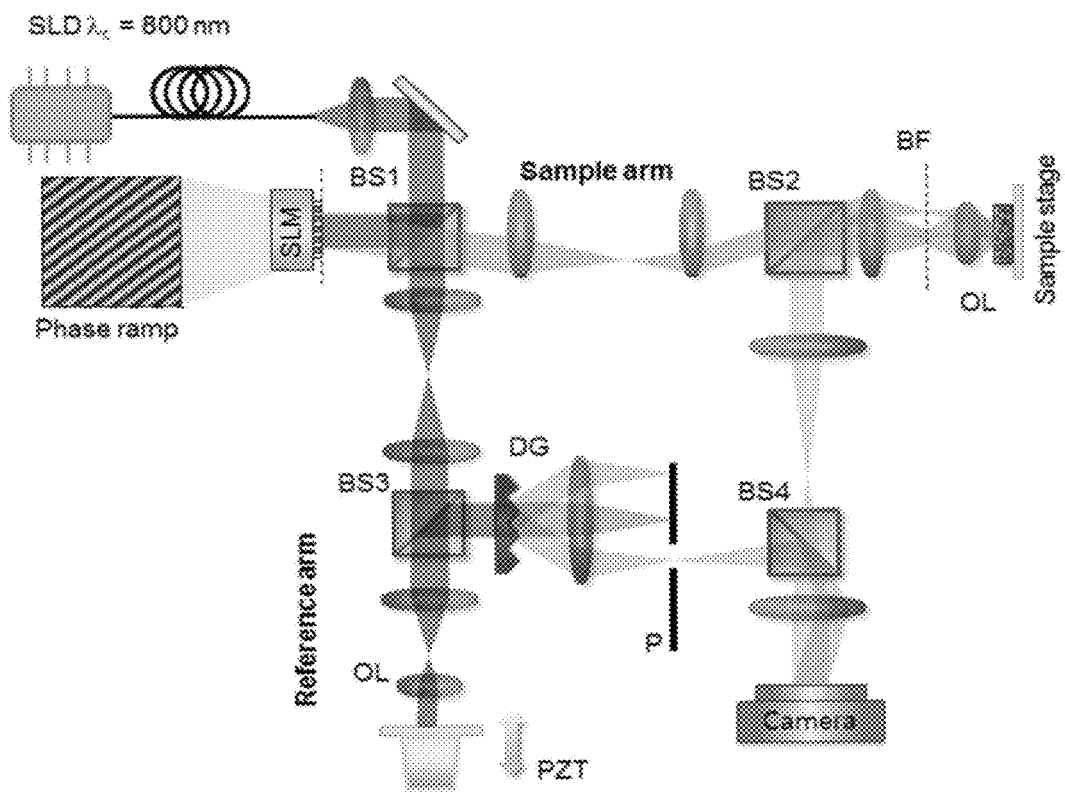
FIG. 1 is a view illustrating an imaging device applied to a conventional CLASS algorithm.
Figure 2:
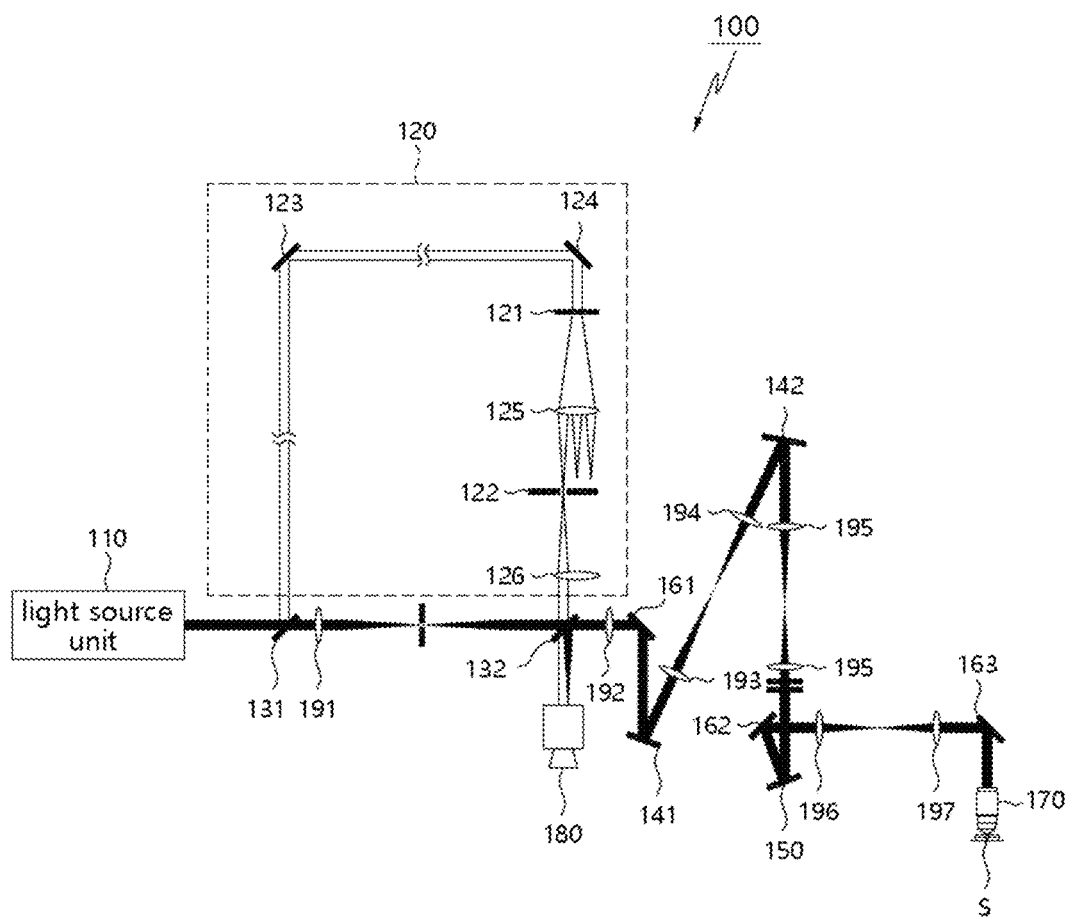
FIG. 2 is a view illustrating a setup example of a focus scan type imaging device for imaging a target object in a sample that induces aberration according to the present disclosure.

FIG. 2 is a view illustrating a setup example of a focus scan type imaging device 100 for imaging a target object in a sample that induces aberration according to the present disclosure.

Referring to FIG. 2, the focus scan type imaging device 100 according to an exemplary embodiment of the present disclosure includes: a light source unit 110, an optical interferometer, a camera module 180, scanning mirrors 141 and 142, a wavefront shaping modulator 150, and an imaging controller (not shown). Here, in the present disclosure, the imaging device 100 images an interference light in the focus scan type through the optical interferometer.

The light source unit 110 emits a light beam. In the present disclosure, a titanium-sapphire laser (Ti: Sapphire laser) having a center wavelength of 900 nm, a bandwidth of 25 mm, and a repetition rate of 80 MHz is applied as an example, and a short-coherence light source is used as an example.

The optical interferometer splits the beam emitted from the light source unit 110 into a sample wave and a reference wave, and provides an interference wave formed by interference between a reflection wave, which is the sample wave reflected from a sample including a target object, and the reference wave. In the present disclosure, it is exemplified that the optical interferometer is configured as a Mach-Zehnder interferometer.

More specifically, referring to FIG. 2, a beam emitted from the light source unit 110 is split into a sample wave and a reference wave by a first beam splitter 131. A reflection wave reflected from the sample and a reference wave passing through a reference light path are combined while both passing through a second beam splitter 132, so as to form a Mach-Zehnder interference wave as described above, thereby being imaged by the camera module 180.

The sample wave that is split by the first beam splitter 131 passes through the second beam splitter 132 toward the sample. The sample wave passing through the second beam splitter 132 is illuminated to the sample through the scanning mirrors 141 and 142, the wavefront shaping modulator 150, and an objective lens 170. The reflection wave reflected from the sample passes through the objective lens 170, the wavefront shaping modulator 150, and the scanning mirrors 141 and 142, and is reflected by the second beam splitter 132, so as to form the interference wave by interference with the reference wave, thereby being directed to the camera module 180.

Here, the objective lens 170 according to the present disclosure is configured to cause a focus light to illuminate a sample, and in the present disclosure, a water immersion objective lens 170 is applied as an example.

The disposition of optical components on the optical path of the sample wave shown in FIG. 2 is only an example, and may be provided in various forms so as to allow the focus light to illuminate a target object in the sample. It is natural that positions of the scanning mirrors 141 and 142 and the wavefront shaping modulator 150 may be changed as well.

Unexplained reference numerals 191 to 198 in FIG. 2 denote lenses disposed on the optical path, and reference numerals 161 to 163 denote mirrors installed to change the optical path.

A plurality of lenses 125 and 126, a diffraction grating 121, and mirrors 123 and 124 may be installed on an optical path of the reference wave. A diffraction beam first diffracted by the diffraction grating 121 is selected by an aperture 122, is directed to a camera in a form of a plane wave, and as described above, is directed toward the camera module 180 while forming the interference wave by interference with the reflection wave at the second beam splitter 132. Only the diffraction beam first diffracted by the diffraction grating 121 is directed to the camera module 180 as a reference light, so that a temporal pulse front is kept parallel to a camera plane, and thus a phase front is inclined with respect to the plane of the camera module 180.

In the present disclosure, the interference between the sample wave and the reference wave forms an off-axis interferogram, and in this way, it is exemplified that an amplitude and a phase map of the reflection wave are detected at a temporal gating width of 15 μm, which is half the coherence length.

Meanwhile, the scanning mirrors 141 and 142 are disposed on the optical path of the sample wave of the optical interferometer, and configured to reflect the sample wave so as to scan the sample by the sample wave. In the present disclosure, it is exemplified that a pair of galvanometer scanning mirrors are disposed on the optical path of the sample wave.

The pair of galvanometer scanning mirrors adjust angles of the sample wave under the control of the imaging controller so as to cause the focus beam for scanning to be emitted with respect to an x-axis and a y-axis of the sample plane. In the present disclosure, as in a general confocal microscope, the pair of galvanometer scanning mirrors cause the sample plane to be scanned with the focus beam by raster-scanning the sample by the focus beam. Here, both of the pair of galvanometers are disposed on the optical path of the sample wave, so as to be positioned on a plane conjugated to a back pupil of the objective lens 170.

The focus beam scanning the sample via the pair of galvanometer scanning mirrors is reflected from the sample, passes through the objective lens 170 again, and is directed to the second beam splitter 132 along the optical path of the sample wave. After de-scanning, via the pair of galvanometer scanning mirrors, the focus beam is finally collected by the camera module 180 positioned on the conjugate image plane.

The wavefront shaping modulator 150 is disposed on the optical path of the sample wave of the optical interferometer. In the present disclosure, it is exemplified that a liquid crystal-based spatial light modulator (SLM) is applied as the wavefront shaping modulator 150.

The imaging controller operates in modes including a phase map calculation mode and an imaging mode. In the phase map calculation mode, an aberration-corrected phase map for correcting sample-induced aberrations is calculated. In the imaging mode, the aberration-corrected phase map calculated in the phase map calculation mode is displayed on the wavefront shaping modulator 150 to image the target object in a state where the sample-induced aberrations are corrected.

Here, the imaging controller controls the wavefront shaping modulator 150 to simply operate as a mirror in the phase map calculation mode, and calculates the aberration-corrected phase map on the basis of the known CLASS algorithm. In addition, the imaging controller images the target object in a state where the aberration-corrected phase map calculated through the CLASS algorithm is displayed on the wavefront shaping modulator 150 and the sample-induced aberrations is physically corrected in the imaging mode, thereby imaging the target object in real time.

Figure 3:
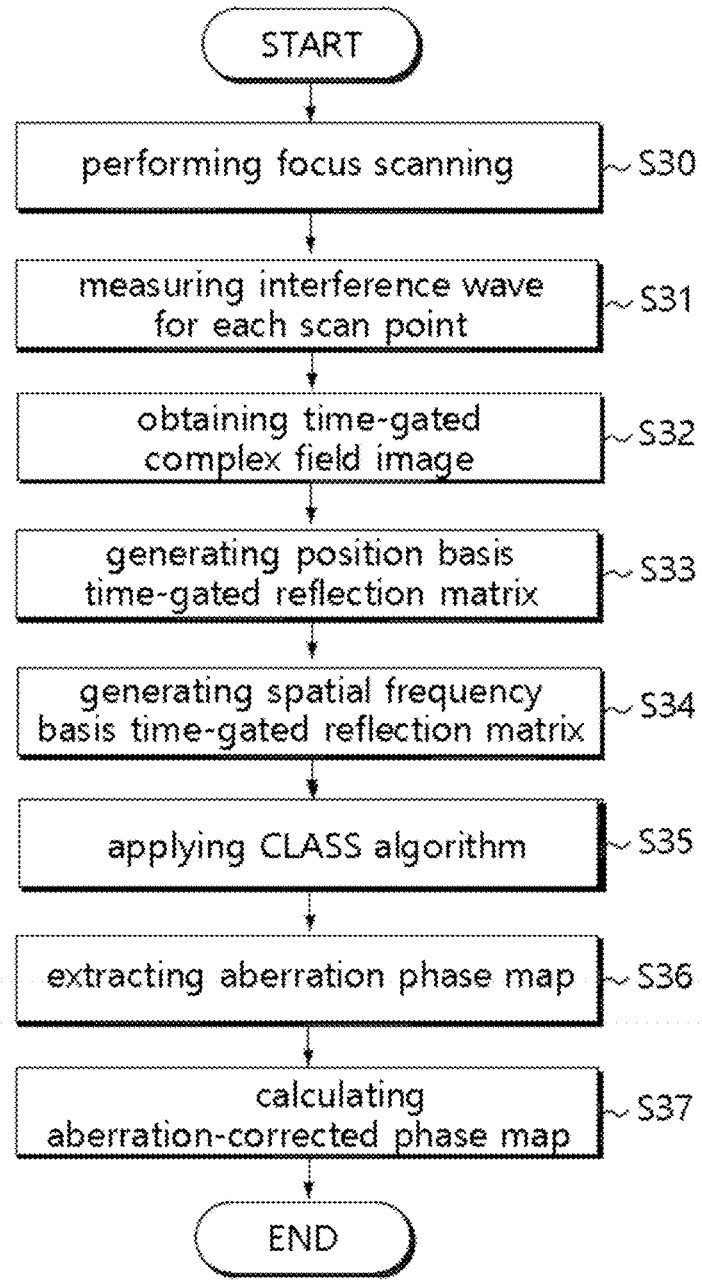
FIGS. 3 to 7 are views illustrating processes of calculating an aberration-corrected phase map in the focus scan type imaging device according to the present disclosure.

Hereinafter, a method of calculating an aberration-corrected phase map in a focus scan type imaging device 100 according to the present disclosure will be described in detail with reference to FIG. 3.

First, in step S30, an imaging controller controls a pair of scanning mirrors 141 and 142 in a state of controlling a wavefront shaping modulator 150 to simply operate as a mirror, and controls a sample wave to focus scan a sample, in other words, for example, as described above, controls the sample wave to raster-scan the sample.

Next, in step S31, the imaging controller controls the camera module 180 to image an interference wave generated by interference between a reflection wave reflected from the sample at each scan point and a reference wave. In step S31, the imaging controller obtains a plurality of time-gated complex field images (or a time-gated complex field map, hereinafter the same) on the basis of the interference wave imaged for each scan point.

Figure 4:
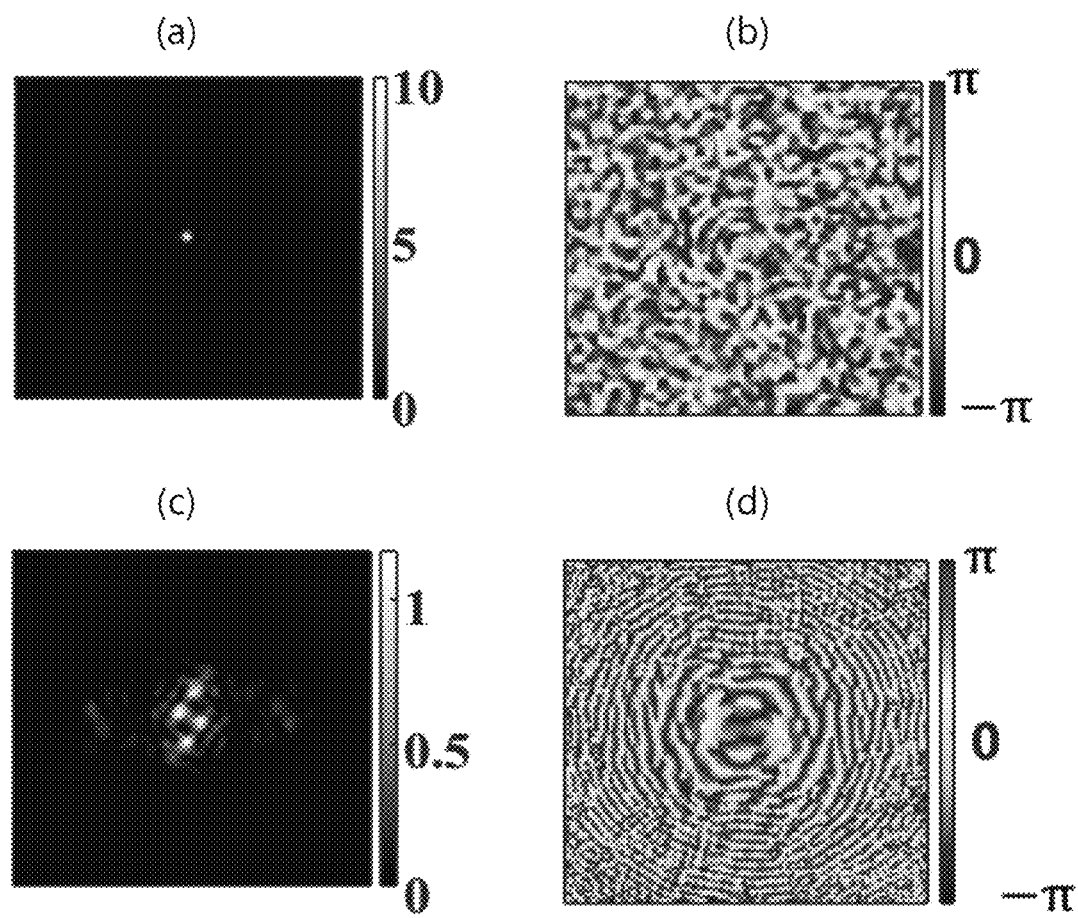

More specifically, FIGS. 4(*a*) and 4(*b*) are views respectively illustrating an intensity image and a phase image, which are obtained by a camera module 180 when there is no aberration, and FIGS. 4(*c*) and 4(*d*) are views respectively illustrating an intensity image and a phase image, which are obtained by the camera module 180 when the aberration is present. It may be confirmed that as shown in FIG. 4(*a*), when there is no aberration, a focal width is 400 nm that is the same as that of a diffraction-limited spot, and as shown in FIG. 4 (*b*), a meaningful phase is obtained only when the phase is obtained near a spot formed in focus.

However, it may be confirmed that when aberrations exist in the sample, peak strength has about 10 times weaker strength than that of no aberration case and the distribution of spots is remarkably expanded. Similarly, in a case of a phase image, it may be confirmed that meaningful phase values are extended to a whole image.

Figure 5:
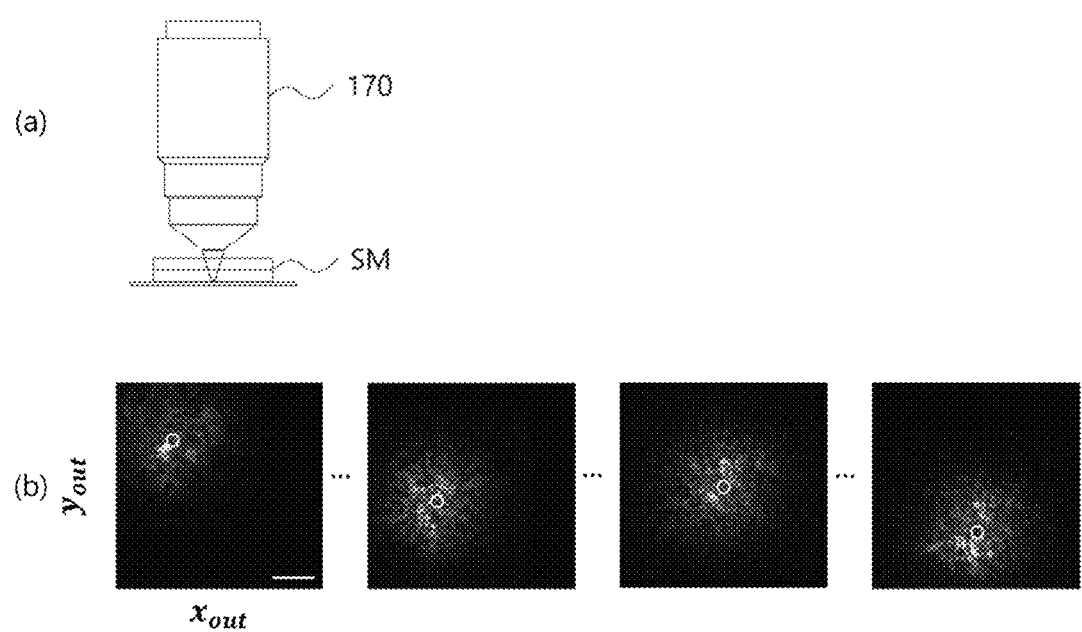

In the present disclosure, as shown in FIG. 5 (*a*), an experiment is conducted by disposing a homemade Siemens star target, which is used as a test sample, at a position under two layers of polyethylene terephthalate that induce strong high-order aberration.

Describing in detail a process of obtaining a time-gated complex field image, the time-gated complex field image of a reflection wave $E_{cam}(r_{cam}; r_{in})$ on a camera plane positioned at a de-scanned coordinate $r_{cam}$ may be expressed as [Equation 1] for a focus beam aimed at a point $r_{in}$ in a sample plane.

$$E_{cam}(r_{cam}; r_{in}) = \int P_{out}(r_{cam} + r_{in}; r) \cdot [O(r) \cdot P_{in}(r; r_{in})]d^2r + E_m(r_{cam}; r_{in}).$$

[Equation 1]

Here, $P_{in}(r; r_{in})$ is a sample-induced E-field point spread function at a point r in the sample plane, $O(r)$ is an object function of a target object, $P_{out}(r_{cam}+r_{in};r)$ represents the E-field point spread function of a reflection wave, and $r_{cam}+r_{in}$ describes a de-scan operation of scanning mirrors 141 and 142, i.e., galvanometer scanning mirrors. In addition, $E_m(r_{cam}; r_{in})$ denotes a speckle field caused by a time-gated multiple scattered wave that is not reflected from the target object but is scattered multiple times by a scattering medium on the target object.

The time-gated complex field image shown in [Equation 1] is detected at one point in the center of a camera for each scanning point due to de-scanning by the galvanometer scanning mirrors, whereby an input position and an output position may not be distinguished from each other. That is, as shown in FIG. 5(*b*), the time-gated complex field image of a corresponding position of each scanning point is not obtained. Accordingly, in order to distinguish the input position from the output position, a process of shifting each position by a physically illuminated position is required.

In the present disclosure, in order to identify sample-induced aberrations, the time-gated complex field image of [Equation 1] is transformed into a time-gated complex field image of a reflection wave at laboratory frame coordinates $r_{out}$. Since $E_{cam}(r_{cam}; r_{in})$ is obtained by $-r_{in}$ after de-scanning, a shift may be compensated by [Equation 2].

$$E_{lab}(r_{out};r_{in})=E_{cam}(r_{out}-r_{in};r_{in})$$

[Equation 2]

As shown in FIG. 5(*b*) through [Equation 2], the time-gated complex field image with a changed position thereof in the camera plane may be obtained. Although only an amplitude image, that is, an intensity image, is shown in FIG. 5(*b*), a phase image corresponding to those images is also obtained as shown in FIG. 3(*d*).

Figure 6:
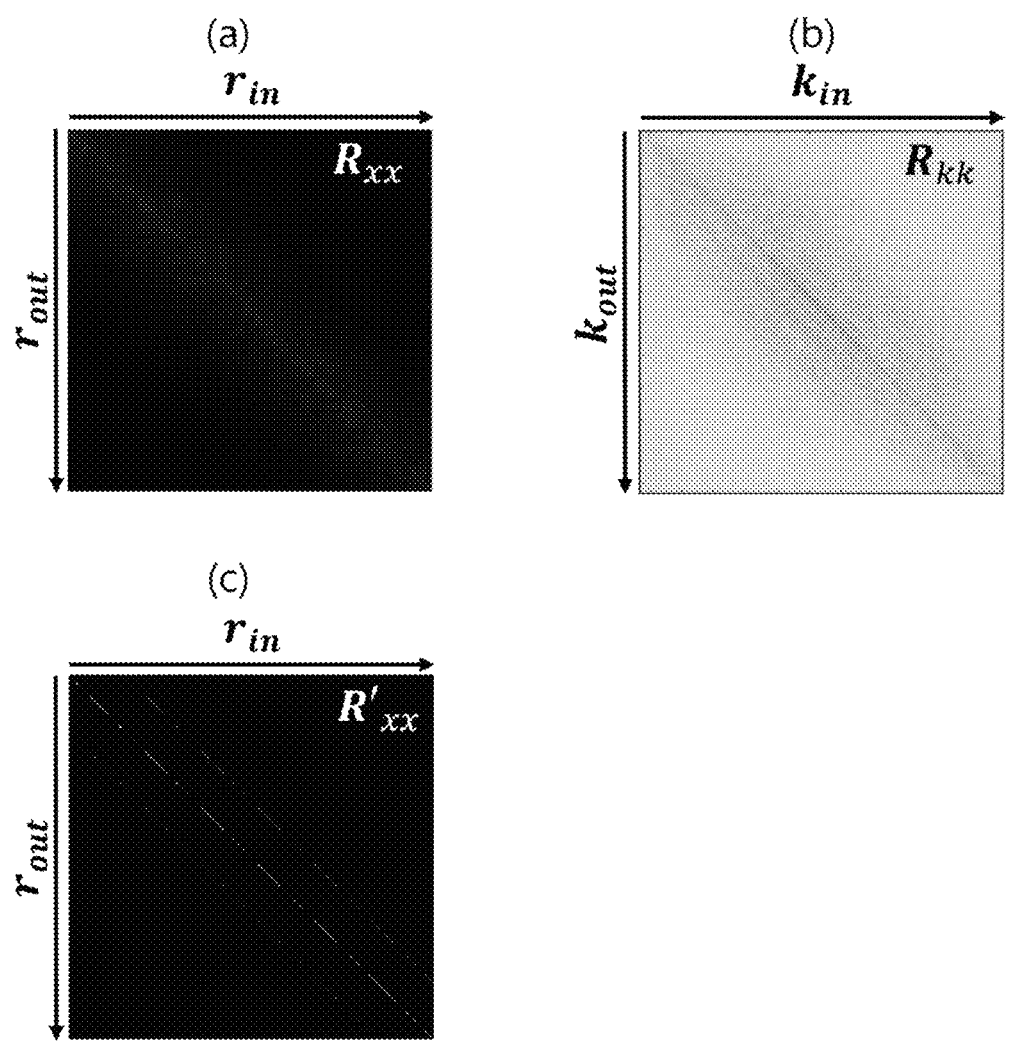

When the time-gated complex field image for each scan point is obtained, a position basis time-gated reflection matrix is generated by using a plurality of time-gated complex field images in step S33. By using a set of the time-gated complex field images shown in FIG. 5(*b*), the position basis time-gated reflection matrix R may be generated by assigning $E_{lab}(r_i; r_j)$ to matrix components $r_{ij}$ of the position basis time-gated reflection matrix. That is, each time-gated complex field image is assigned to a respective column of the position basis time-gated reflection matrix as a vector, thereby enabling the generation of the position basis time-gated reflection matrix. The position basis time-gated reflection matrix may be expressed as [Equation 3], as shown in FIG. 6(*a*).

$$R=P_{out}^{T}OP_{in}+M$$

[Equation 3]

In [Equation 3], O is a diagonal matrix in reflection geometry, and represents an object function of the target object. That is, $o_{i,i}=O(r_i)$. $P_{in}$ is an input point variance function. The matrix components are constructed by $p_{ij}=P_{in}(r_i; r_j)$. Similarly, an output point variance function $P_{out}$ may be constructed. $P^T$ denotes a transpose matrix of P. M is a random matrix representing a time-gated multiple backscattered wave.

Figure 7:
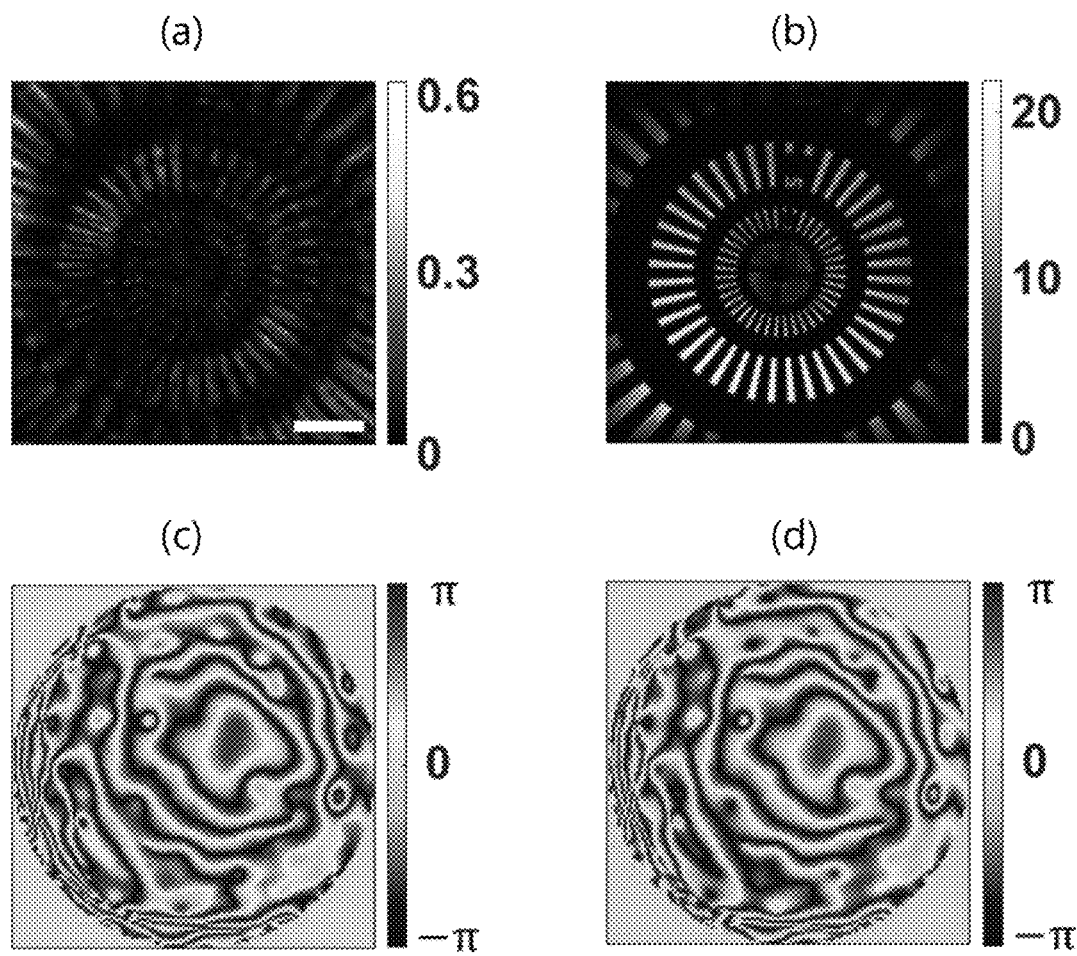

Here, a confocal image may be obtained from main diagonal components of the time-gated reflection matrix, but as shown in FIG. 7(a), due to multiple scattering noises caused by sample-induced aberrations, the confocal image is blurred and severely distorted. In addition, large portions of the backscattered waves are detected in off-diagonal components of the time-gated reflection matrix R, resulting in a phenomenon in which signal intensity is decreased in the confocal image.

In order to obtain an image in which the sample-induced aberrations are corrected, the CLASS algorithm is applied in the present disclosure. In step S34, for application of the CLASS algorithm, the position basis time-gated reflection matrix is transformed to generate a spatial frequency basis time-gated reflection matrix.

The matrix transformation is exemplified such that the spatial frequency basis time-gated reflection matrix is generated by applying a Fourier transform to each of row vectors and column vectors, constituting the position basis time-gated reflection matrix. The spatial frequency basis time-gated reflection matrix $\tilde{R}$ may be expressed as [Equation 4], as shown in FIG. 6(b).

$$\tilde{R}=\tilde{P}_{out}^T \tilde{O} \tilde{P}_{in}+\tilde{M} \quad \text{[Equation 4]}$$

In [Equation 4], $\tilde{O}=F^{-1}OF$ is a spectral matrix of a target object in the reflection geometry, and has a form of a Hankel matrix. In the Hankel matrix, skew-diagonal components $\tilde{o}_{i-j,j}$ are provided by a spatial frequency spectrum $\tilde{O}(k_i)$ of an image of the target object. That is, $\tilde{o}_{i-j,j}=\tilde{O}(k_i)$. In addition, $\tilde{P}=F^{-1}PF$ is a transmission matrix for wave propagation to a sample plane in k space, and $\tilde{M}$ is a random matrix in the k space for time-gated multiple scattered waves.

Here, the diagonal components of $\tilde{P}$ relates to a single scattered wave. The single scattered wave does not affect the direction of wave propagation, and only an amplitude and a phase of the single scattered wave change. Whereas, both a direction and a complex amplitude of an incident wave are randomly changed, whereby off-diagonal terms generate multiple scattered waves.

When a point spread function is shift-invariant with respect to a field of illumination (FOI), that is, in a case of $P(r_{out}; r_{in})=P(r_{out}-r_{in})$, P has a form of a Toeplitz matrix. In addition, $\tilde{P}$ is a diagonal matrix in which the diagonal components correspond to a complex pupil function $\tilde{P}(k)$.

As described above, when the spatial frequency basis time-gated reflection matrix is generated, the spatial frequency basis time-gated reflection matrix is applied to the CLASS algorithm in step S35. As disclosed in the above described thesis, the CLASS algorithm maximally increases the overall intensity of the confocal image, thereby estimating pupil aberrations on an illumination side and a detection side, that is, both of the incident wave and the reflection wave. In the CLASS algorithm, aberrated waves, which are not the multiple scattered waves and are positioned in non-diagonal components, are coherently added to the diagonal components, whereby the aberrations are corrected.

In the present disclosure, it is exemplified that a sample wave, i.e., an input complex pupil function, and a reflection wave, i.e., an output complex pupil function are extracted by using the CLASS algorithm, thereby extracting either one as an aberration phase map. FIGS. 7(c) and 7(d) are views respectively illustrating the input complex pupil function and the output complex pupil function.

Here, when phase conjugation of the aberration phase map is applied to the rows and columns of the spatial frequency basis time-gated reflection matrix shown in FIG. 6(b) and then the spatial frequency basis time-gated reflection matrix is transformed to a position basis time-gated reflection matrix, it may be confirmed that the size of the diagonal components is greatly improved as shown in FIG. 6(c) and the size of the non-diagonal components is greatly reduced as compared to that of FIG. 6(a). In addition, the confocal image extracted from the position basis time-gated reflection matrix shown in FIG. 6(c) increases the intensity thereof by 50 times compared to that of the image before correction as shown in FIG. 7(b), and the spatial resolution is estimated to be 420 nm, which is close to an ideal diffraction limit of 400 nm.

By using the above correction principle, the imaging controller calculates the phase conjugate of the aberration phase map as an aberration-corrected phase map in step S37.

When the aberration-corrected phase map is calculated in the above process, that is, in the phase map calculation mode, the imaging controller controls the aberration-corrected phase map to be displayed on the wavefront shaping modulator. When the target object is imaged according to the focus scan type through the control of the scanning mirrors 141 and 142, the sample-induced aberrations are physically corrected by the aberration-corrected phase map displayed on the wavefront shaping modulator 150, and thus an aberration-corrected image for each scan point may be obtained through the camera module 180.

According to the above configuration, in the conventional CLASS algorithm, an image is obtained by changing the wavefronts of the wavefront shaping modulator such as a spatial light modulator a plurality of times in the state of emitting a plane wave, and then the image is calculated numerically, whereby an imaging time increases according to the wavefront change of the wavefront shaping modulator. Whereas, in the focus scan type imaging device 100 according to the present disclosure, an aberration-corrected phase map is calculated in the focus scan type through adjusting the angles of scanning mirrors 141 and 142, whereby the imaging time may be reduced.

In addition, in a state where the aberration-corrected phase map is calculated and then is displayed on the wavefront shaping modulator 150, the sample-induced aberrations are physically corrected, whereby imaging of the target object may be conducted in real time without a separate image process for aberration correction.

Figure 8:
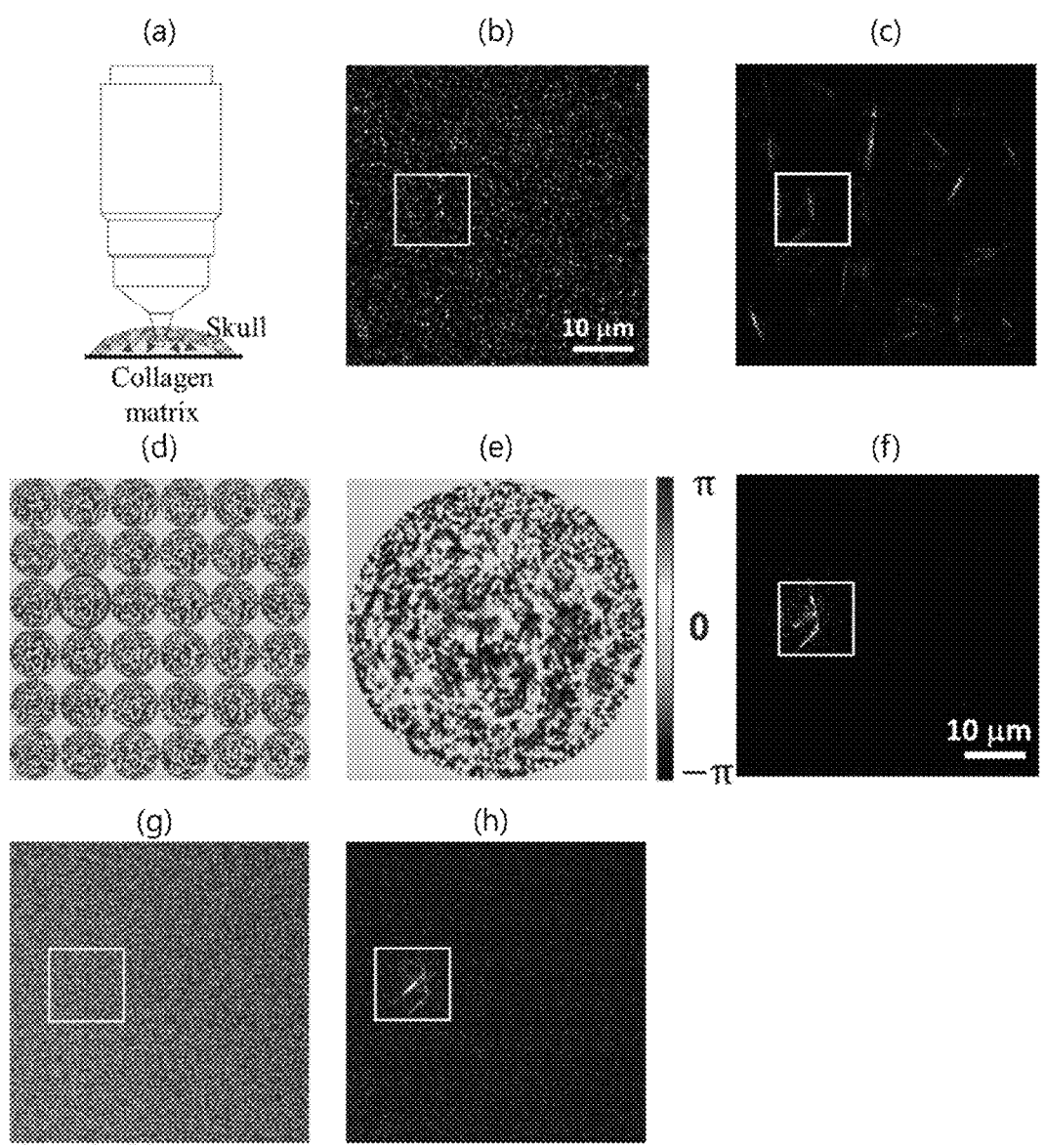
FIG. 8 is a view illustrating an effect of the focus scan type imaging device according to the present disclosure.

FIG. 8 is a view illustrating an effect of the focus scan type imaging device 100 according to the present disclosure.

In general, since phase-referenced reflection-matrix microscopy (RMM) is capable of managing higher-order aberrations with an improved signal-to-noise ratio, the RMM is used to obtain an image of a subject under an uninjured skull of a rat. As the rat skull includes numerous microscopic microcells, extremely high order optical aberrations as well as strong multiple scattering noises are induced.

To date, only multi-photon imaging techniques have been used to image a subject under the skull, and label-free reflectance imaging technique is considered to be unusable. This is mainly because only unidirectional aberration has a significant importance in multiphoton microscopy, but all the reciprocal aberrations in reflex photography impair the image together.

For experimental verification, as shown in FIG. 8(a), the entire rat skull is disposed on an upper part of collagen gel. The skull is extracted from a 3 weeks old rat, and the thickness of the skull is about 100 μm. The objective focus of an objective lens is set at a point of 240 μm below the bottom surface of the skull.

Because of the strong aberrations induced by the skull, an image taken by general optical coherence microscopy does not visualize collagen fibers, as shown in FIG. 8(b).

In fact, since the aberrations caused by the skull are very serious and complex, the aberrations vary even depending on the field of view. Accordingly, the CLASS algorithm does not work at all when applied to the entire focus scan area of 50×50 μm$^2$.

A collagen fiber structure is visible with the naked eyes only when the CLASS algorithm is locally applied to a subarea of 8×8 μm$^2$, where 8×8 μm$^2$ is a size of each patch with the same planar view of the skull. Accordingly, the scan area is divided into 6×6 image patches, and the CLASS algorithm is independently applied to each of the scan area. In this way, the fine collagen fibers are clearly analyzed with respect to the entire field of view (see FIG. 8(c)).

FIG. 8(d) is a view illustrating an aberration phase map obtained for 36 image patches. There are about 15,000 pixels per patch, and the number of pixels are thus extremely high. The aberration phase map is very complex, so a normalized correlation between adjacent pupil functions is less than 0.1 on average.

As described above, the imaging device 100 according to the present disclosure corrects aberrations in hardware. Since the aberrations caused by the skull vary depending on positions, it is possible to physically correct each patch having the same planar view simultaneously.

For example, the aberration phase map indicated by a red circle in FIG. 8(d) is a view as shown in FIG. 8(e), and is recorded on a spatial light modulator through phase conjugation. The images, before and after the aberrations are physically corrected by the spatial light modulator, are as shown in FIGS. 8(g) and 8(h), respectively.

Figure 9:
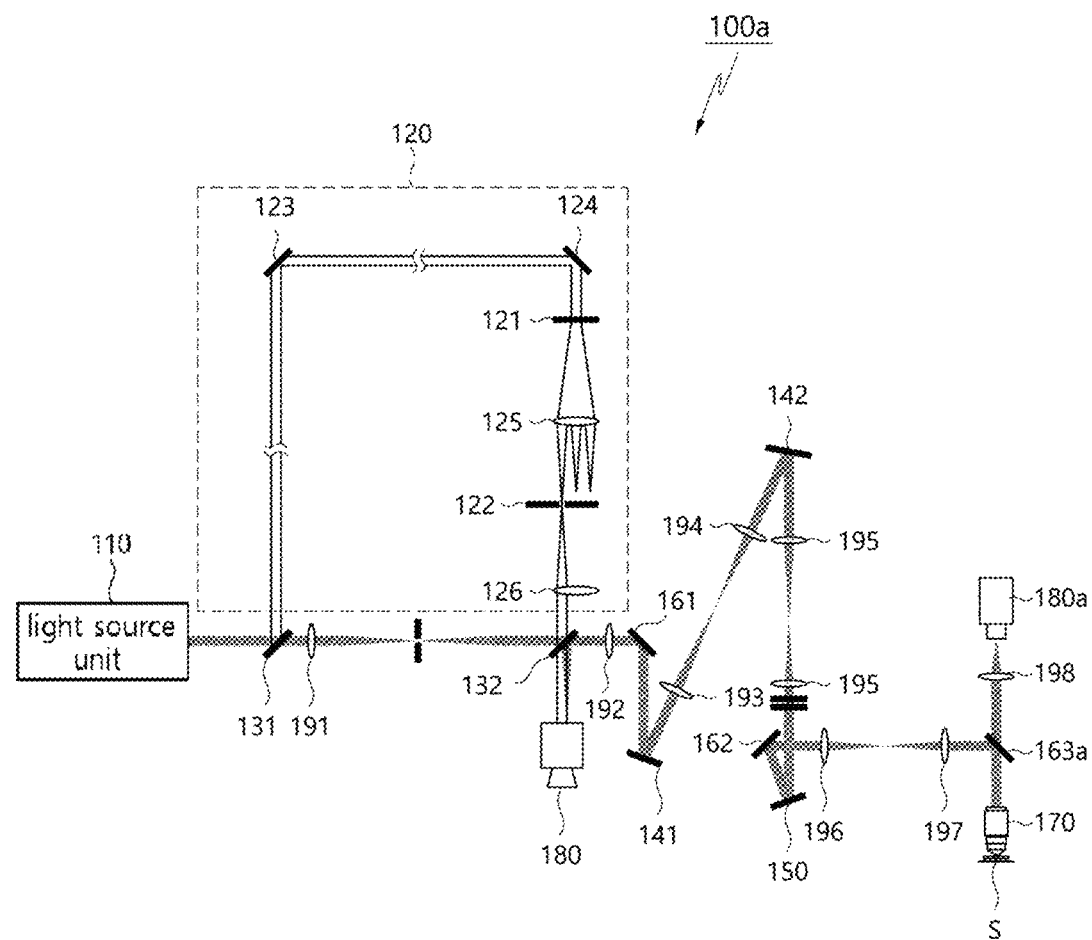
FIG. 9 is a view illustrating a setup example of a focus scan type imaging device for imaging a target object in a sample that induces aberration according to another exemplary embodiment of the present disclosure.

Meanwhile, FIG. 9 is a view illustrating a setup example of a focus scan type imaging device 100a for imaging a target object in a sample that induces aberration according to another exemplary embodiment of the present disclosure.

By using an aberration-corrected phase map calculated in the above-described phase map calculation mode, the imaging device 100a shown in FIG. 9 obtains a fluorescence image in a state where the aberration-corrected phase map is displayed on a wavefront shaping modulator 150.

To this end, the imaging device 100a may be configured to further include a wavelength splitter 163a and a photomultiplier tube 180a.

The wavelength splitter 163a passes fluorescence waves among reflection waves reflected from a sample, and reflects the remaining waves of the reflection waves toward an optical interferometer 120 side. In the present disclosure, it is exemplified that the wavelength splitter 163a is provided in a form of a short pass dichroic mirror.

The fluorescence waves passing through the wavelength splitter 163a are incident to the photomultiplier tube 180a. Here, a lens 198 for focusing the fluorescence waves passing through the wavelength splitter 163a may be installed between the wavelength splitter 163a and the photomultiplier tube 180a.

Here, an imaging controller generates a fluorescence image on the basis of the fluorescence waves detected by the photomultiplier tube 163a in an imaging mode. Here, as described above, the fluorescence image generated by the imaging controller is generated in a state where the aberration-corrected phase map is displayed on the wavefront shaping modulator 150, and thus the fluorescence image may be generated in a state where the aberrations are corrected.

Figure 10:
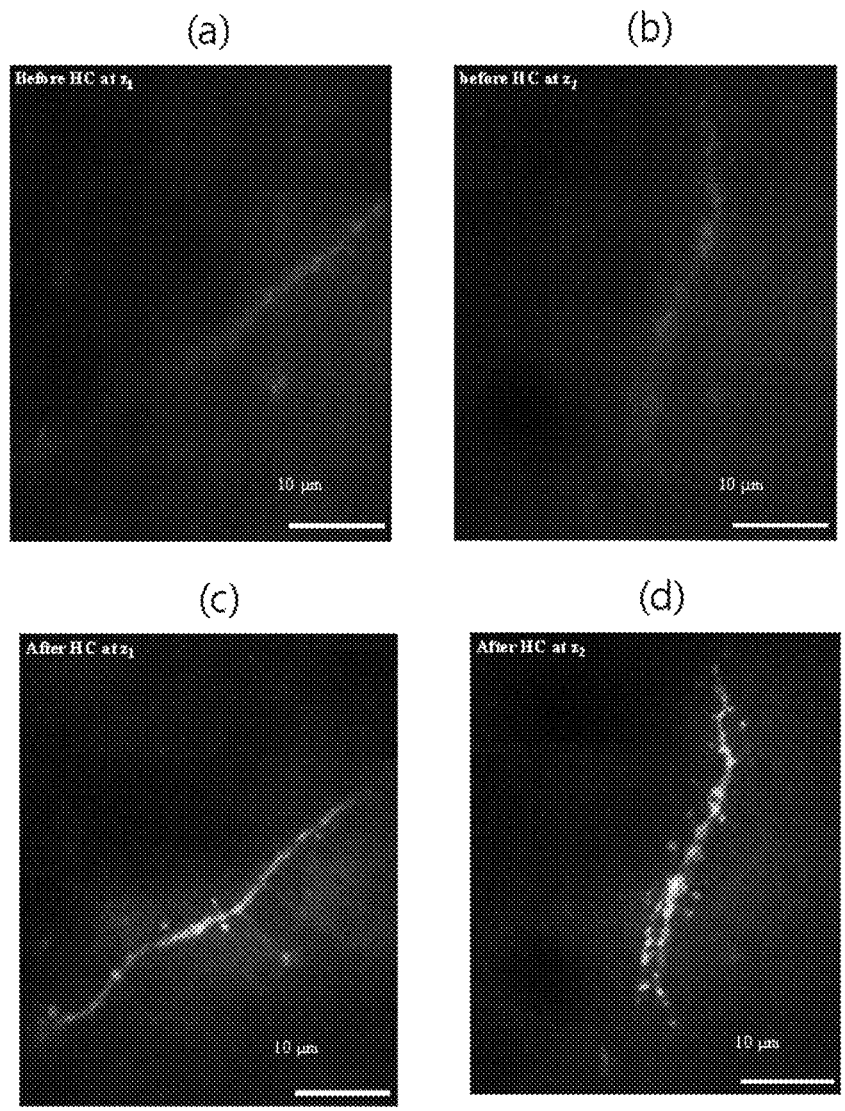
FIG. 10 is a view illustrating an effect of the focus scan type imaging device shown in FIG. 9.

FIG. 10 is a view illustrating an effect of the focus scan type imaging device 100a shown in FIG. 9. FIG. 10 is a fluorescence image taken with myelin under the skull of a rat, FIGS. 10(a) and 10(b) are images taken in a state where the aberration-corrected phase map is not applied, and FIGS. 10(c) and 10(d) are images taken in a state where the aberration-corrected phase map is applied.

As may be seen in FIG. 10, it may be confirmed that through the aberration-corrected phase map, the aberrations are corrected and the image becomes clearer.

In the exemplary embodiment shown in FIG. 9, the fluorescence image using fluorescence waves is described as the example, but it is natural that generation of a fluorescence image using secondary harmonic generation (SHG) signals may be applied.

Although the exemplary embodiments of the present disclosure have been described in detail above, the scope of the present disclosure is not limited thereto, and various modifications and improvements of those skilled in the art using the basic concepts of the present disclosure as defined in the following claims are also included in the scope of the present disclosure.

DESCRIPTION OF THE REFERENCE NUMERALS IN THE DRAWINGS

100: imaging device 110: light source unit
121: diffraction grating 122: aperture
123,124,161,162,163: mirror
125,126,191,192,193,194,195,196,197,198: lens
131: first beam splitter 132: second beam splitter
141, 142: scanning mirrors 150: wavefront shaping modulator
170: objective lens 180: camera module

INDUSTRIAL APPLICABILITY

The present disclosure may be applied to fields such as optical microscopy for imaging deep tissue by using confocal imaging.

The invention claimed is:

1. A focus scan type imaging device for imaging a target object in a sample that induces aberration, the device comprising:
   a light source unit configured to emit a beam;
   an optical interferometer configured to split the beam emitted from the light source into a sample wave and a reference wave, and provide an interference wave formed by interference between a reflection wave that is the sample wave reflected from the sample and the reference wave;
   a camera module configured to image the interference wave;
   a scanning mirror disposed on an optical path of the sample wave of the optical interferometer and configured to reflect the sample wave so as to cause the sample wave to scan the sample;

a wavefront shaping modulator disposed on the optical path of the sample wave of the optical interferometer; and an imaging controller configured to operate in a phase map calculation mode in which an aberration-corrected phase map for correction of sample-induced aberrations is calculated, and in an imaging mode in which the aberration-corrected phase map is displayed on the wavefront shaping modulator to image the target object in a state where the sample-induced aberrations are corrected, wherein the imaging controller controls the wavefront shaping modulator to operate as a mirror in the phase map calculation mode, and calculates the aberration-corrected phase map on the basis of a CLASS algorithm.

2. The device of claim 1, wherein the imaging controller is configured to perform, in the phase map calculation mode, steps comprising:

controlling the scanning mirror so as to cause the sample to be focus-scanned with the sample wave;

obtaining a plurality of time-gated complex field images on the basis of the respective interference wave imaged for each point of the sample by the camera module through focus scanning;

generating a position basis time-gated reflection matrix by using the plurality of time-gated complex field images;

transforming the position basis time-gated reflection matrix into a spatial frequency basis time-gated reflection matrix; and extracting an aberration phase map of the sample-induced aberrations by applying the spatial frequency basis time-gated reflection matrix to the CLASS algorithm, and is configured to generate the aberration-corrected phase map through phase conjugation of the aberration phase map.

3. The device of claim 2, wherein, in the generating of the position basis time-gated reflection matrix, each time-gated complex field image is generated by being assigned to a respective column of the position basis time-gated reflection matrix as a vector.

4. The device of claim 2, wherein, in the transforming of the position basis time-gated reflection matrix into the spatial frequency basis time-gated reflection matrix, the spatial frequency basis time-gated reflection matrix is transformed by applying a Fourier transform to each of row vectors and column vectors, constituting the position basis time-gated reflection matrix.

5. The device of claim 2, wherein, in the extracting of the aberration phase map, any one of a complex pupil function of the sample wave and a complex pupil function of the reflection wave, which are obtained for aberration correction in the CLASS algorithm, is extracted as the aberration phase map.

6. The device of claim 1, further comprising:

a wavelength splitter configured to pass fluorescence waves among the reflection waves reflected from the sample and reflect remaining waves of the reflection waves toward the optical interferometer; and a photomultiplier tube into which the fluorescence waves passing through the wavelength splitter are incident, wherein the imaging controller generates a fluorescence image on the basis of the fluorescence waves detected by the photomultiplier tube in the imaging mode.

* * * * *